(12) United States Patent
Shaikh et al.

(10) Patent No.: US 11,514,817 B2
(45) Date of Patent: Nov. 29, 2022

(54) SMART INTERACTIVE SYSTEM FOR BRAILLE LEARNING

(71) Applicant: THINKERBELL LABS PRIVATE LIMITED, Bengaluru (CN)

(72) Inventors: Saif Ali Shoukat Ali Shaikh, Bengaluru (IN); Dilip Ramesh, Bengaluru (IN); Sanskriti Atul Dawle, Bengaluru (IN); Aman Karan Srivastava, Bengaluru (IN)

(*) Notice: Subject to any disclaimer, the term of this patent is extended or adjusted under 35 U.S.C. 154(b) by 0 days.

(21) Appl. No.: 16/971,028

(22) PCT Filed: Feb. 20, 2019

(86) PCT No.: PCT/IB2019/051370
§ 371 (c)(1),
(2) Date: Aug. 19, 2020

(87) PCT Pub. No.: WO2019/162848
PCT Pub. Date: Aug. 29, 2019

(65) Prior Publication Data
US 2021/0082313 A1  Mar. 18, 2021

(30) Foreign Application Priority Data
Feb. 20, 2018 (IN) .............. 201841006427

(51) Int. Cl.
*G09B 21/00* (2006.01)
(52) U.S. Cl.
CPC ......... *G09B 21/004* (2013.01); *G09B 21/005* (2013.01); *G09B 21/007* (2013.01)

(58) Field of Classification Search
CPC .. G09B 21/004; G09B 21/005; G09B 21/007; B41J 3/32
See application file for complete search history.

(56) References Cited

U.S. PATENT DOCUMENTS

| 924,012 | A | | 6/1909 | Stamps et al. |
| 5,161,975 | A | * | 11/1992 | Andrews .............. G09B 21/003 434/112 |
| 5,725,379 | A | * | 3/1998 | Perry .................. G09B 21/008 434/169 |
| 9,105,196 | B2 | * | 8/2015 | Dobbs .................... G09B 19/24 |
| 2004/0091842 | A1 | | 5/2004 | Carro |
| 2005/0117952 | A1 | | 6/2005 | Damery et al. |
| 2016/0232817 | A1 | | 8/2016 | Djugash |

* cited by examiner

*Primary Examiner* — Peter R Egloff
(74) *Attorney, Agent, or Firm* — Rumit Ranjit Kanakia

(57) ABSTRACT

The present invention discloses completely digitized, smart, interactive and connected system (100) for braille learning. The invention also provides platform for consuming coupled audio-braille tactile lessons that include voice and braille data input or output serving as educational tool for visually challenged. The smart interactive system comprises a braille keyboard (117), a digital braille 10 slate (116), a proximity touch sensor (120) for input, a large braille display (110) and standard braille display (108), a vibration motor (119) and a speaker (113) for haptic and audio data output. The digital braille slate (116) gives both mechanical tactile feedback and audio feedback via speaker (115) as each braille dots are pressed using the stylus (306). The system (100) is connected to the internet 15 allowing for remote software and content updates and upload of data on usage metrics.

9 Claims, 4 Drawing Sheets

SMART INTERACTIVE SYSTEM FOR BRAILLE LEARNING

DESCRIPTION OF THE INVENTION

Technical Field of the Invention

The field of invention generally relates to braille learning systems and devices for blind and visually impaired individuals and more specifically relates to a smart interactive electronic braille learning device for inputting and outputting braille content.

BACKGROUND OF THE INVENTION

Braille is used by blind and visually impaired individuals for reading and writing text. There are a wide range of systems that are available for these purposes. With the advancement in the technology, many of the visually impaired individuals have started using portable braille devices for taking notes. These portable braille devices include input and output interfaces for entering and displaying braille content respectively. The input interface is typically a braille keyboard while the output interface is a refreshable braille display. Each Braille cell typically includes a plurality of electromechanically controlled pins or dots which can be selectively moved up and down to enable tactile braille reading.

There are millions of visually impaired people in the world. Considering that a tactile medium is the only way in which the visually impaired can read and write, it is extremely important for them to learn Braille. There is a direct correlation of low braille literacy and unemployment among the visually impaired. Even in developed countries, braille literacy rates are extremely low. The pedagogy of braille education for all these people has not seen a change since a very long time. The conventional method of learning Braille is not suited for self-learning and requires continuous one to one support from a special education teacher. There is an acute shortage of teachers trained to cater to the needs of visually impaired (VI) students. Mainstream teachers and parents cannot participate in the education of VI students Education for visually impaired has not undergone the shift to digitization of learning pedagogy unlike those for sighted students. There is a lack of on-demand learning content, and collaborative classroom learning. There is no interactive content with instant feedback or live monitoring and analytics on learning outcomes. There is a huge opportunity to improve the efficiency and quality of education for the Visually Impaired.

The patent document JPH06289774A titled "Braille learning device" discloses a device for learning braille such that the contents of braille are confirmed by audio when the characters and the sentences on a braille sheet is traced by a finger. The learner learns braille by himself through the perception of braille on the static braille sheet and the audio output. There are sensors in the device which identify the sheet number hence plural braille sheets can be used and many texts can be studied using this device. However the device does not mention digitizing of braille pedagogy to accomplish step-wise learning.

Patent document U.S. Pat. No. 5,725,379A titled "Braille learning apparatus" relates to a braille learning apparatus for use with a computer. It comprises of a set of tactile flash cards having a pattern of braille dots embossed on it and electrically connected contacts at specific positions. There is a correspondence between the pattern of the braille dots on the card and the contact position which can be sensed by flash card reader. However, it does not mention the learning of braille using audio-tactile means.

The Russian patent document RU2662139C1 titled "Device for fine dotted braille training of blind and visually impaired children" discloses a hand-held device with better training and increased speed of associating tactile-practical perception of braille code with an audio symbol by a child. It contains a PCB with speaker, an indicator and chip for converting braille alphabetic character into audio symbols of Russian alphabet and numeric signs of Braille to audio symbols of numerals.

Thus, there is a need to digitize the pedagogy of Braille and deliver it in an audio-tactile format using hardware, software and braille content to make braille learning easy and possible even without the help of a teacher.

SUMMARY OF THE INVENTION

The present invention provides a completely digitized, smart and interactive touch based system for Braille learning. It includes a digitized version of the entire braille pedagogy that is followed across the globe. The system includes audio-tactile input and output modules that allow users to interface with it. The input modules include a braille keyboard and digitized version of braille slate and stylus. The braille keyboard facilitates learning how to type in Braille. Slate and stylus are a primitive tools used by Visually impaired people for writing achieved by means of embossing dots on the back side of paper. The digitized version of slate eliminates need for paper and facilitates learning how to write in Braille.

The output modules include plurality of enlarged and regular braille display cells. The enlarged cells are essentially scaled up versions of a regular braille display cells. The enlarged cells help users who are beginners or early learners to easily identify position and combinations of dots for different characters. The user then moves to reading on the regular braille display cells. It helps user learn to read by developing the tactile sensitivity in their fingertips.

BRIEF DESCRIPTION OF THE DRAWINGS

The foregoing and other features of embodiments will become more apparent from the following detailed description of embodiments when read in conjunction with the accompanying drawings.

DETAILED DESCRIPTION OF THE INVENTION

Figure 1:
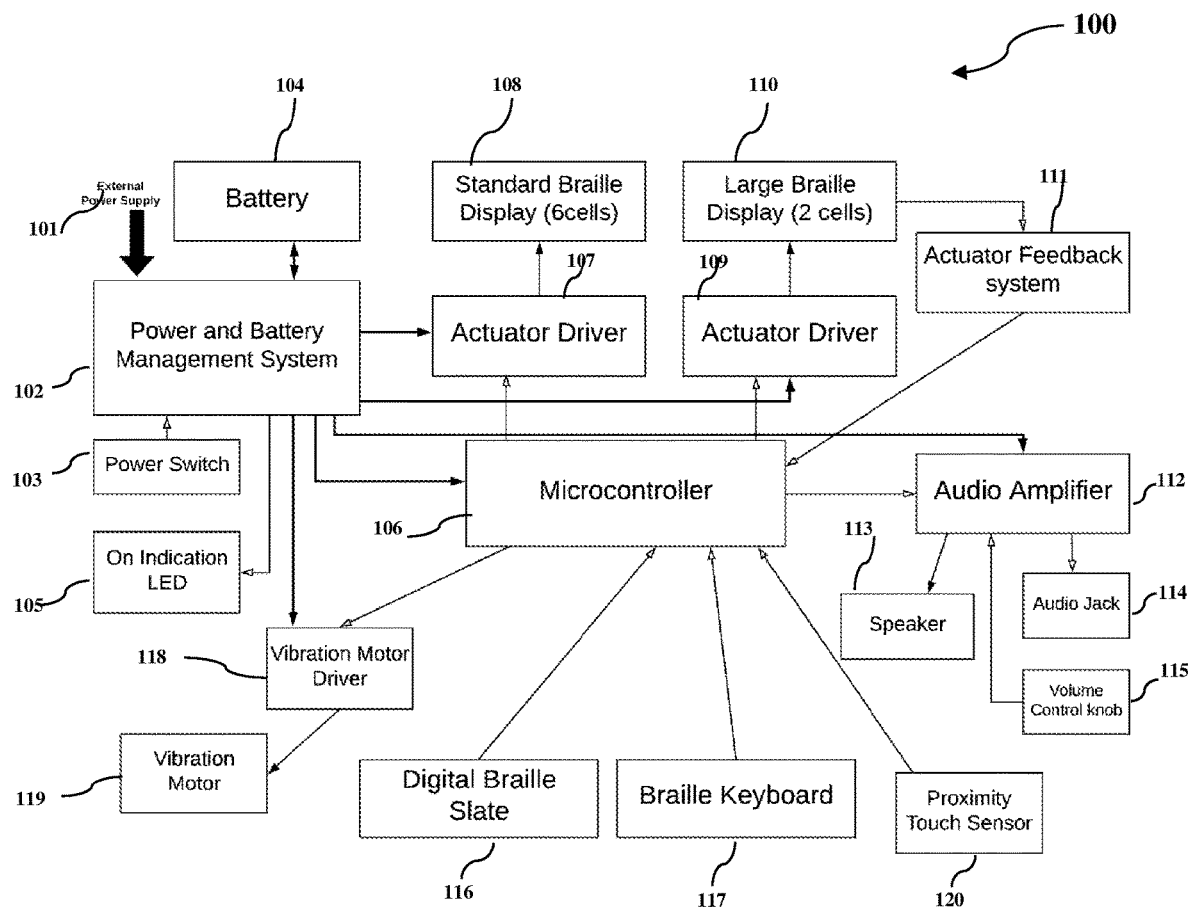
FIG. 1 is a block diagram illustrating a smart interactive system for braille learning, according to an embodiment of the present invention.

The embodiments of the present invention will now be described in detail with reference to the accompanying drawings. However, the present invention is not limited to the embodiments. The present invention can be modified in various forms. Thus, the embodiments of the present invention are only provided to explain more clearly the present invention to the ordinarily skilled in the art of the present invention. In the accompanying drawings, like reference numerals are used to indicate like components.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention is a completely digitized, smart, interactive touch-based system for Braille learning. The invention is optimized to deliver a complete braille literacy solution helping a user to learn to read, write and type in Braille. The system may also be used as a platform for delivering any kind of interactive audio-tactile content thus serving as an educational tool for the visually challenged.

FIG. 1 is a block diagram illustrating a smart interactive system for braille learning, according to an embodiment of the present invention. According to FIG. 1, the smart interactive system comprises an external power supply (101), a power and battery management system (102), an ON/OFF switch (103), a battery (104), a LED for ON indication (105), a microcontroller (106), actuator drivers (107) and (109) to drive the Standard Braille Display (108) and Large Braille Display (110) respectively, an actuator feedback mechanism (111), an audio amplifier system (112), a speaker (113), an audio jack (114) for output to an external speaker/headphones (114), a volume control knob (115), a digital braille slate (116), a braille keyboard (117), a vibration motor driver (118), a vibration motor (119) and a proximity touch sensor (120).

According to the present invention, the external power supply (101) provides electric power to the Power and battery management system (102) which in turn powers the entire system. The Power and battery management (102) system regulates and switches the input supply voltage to necessary lower voltage levels required by the individual modules namely the battery (104), the microcontroller (106), the actuator drivers (107) and (109), audio amplifier (112) and vibration motor driver (118). In the absence of the external power supply (101), the power and battery management system (102) detects the same and the system is now powered via the battery (104). It also monitors the health and the charge level of battery and ensures the charging and discharging happen within the permissible voltage levels.

Figure 2:
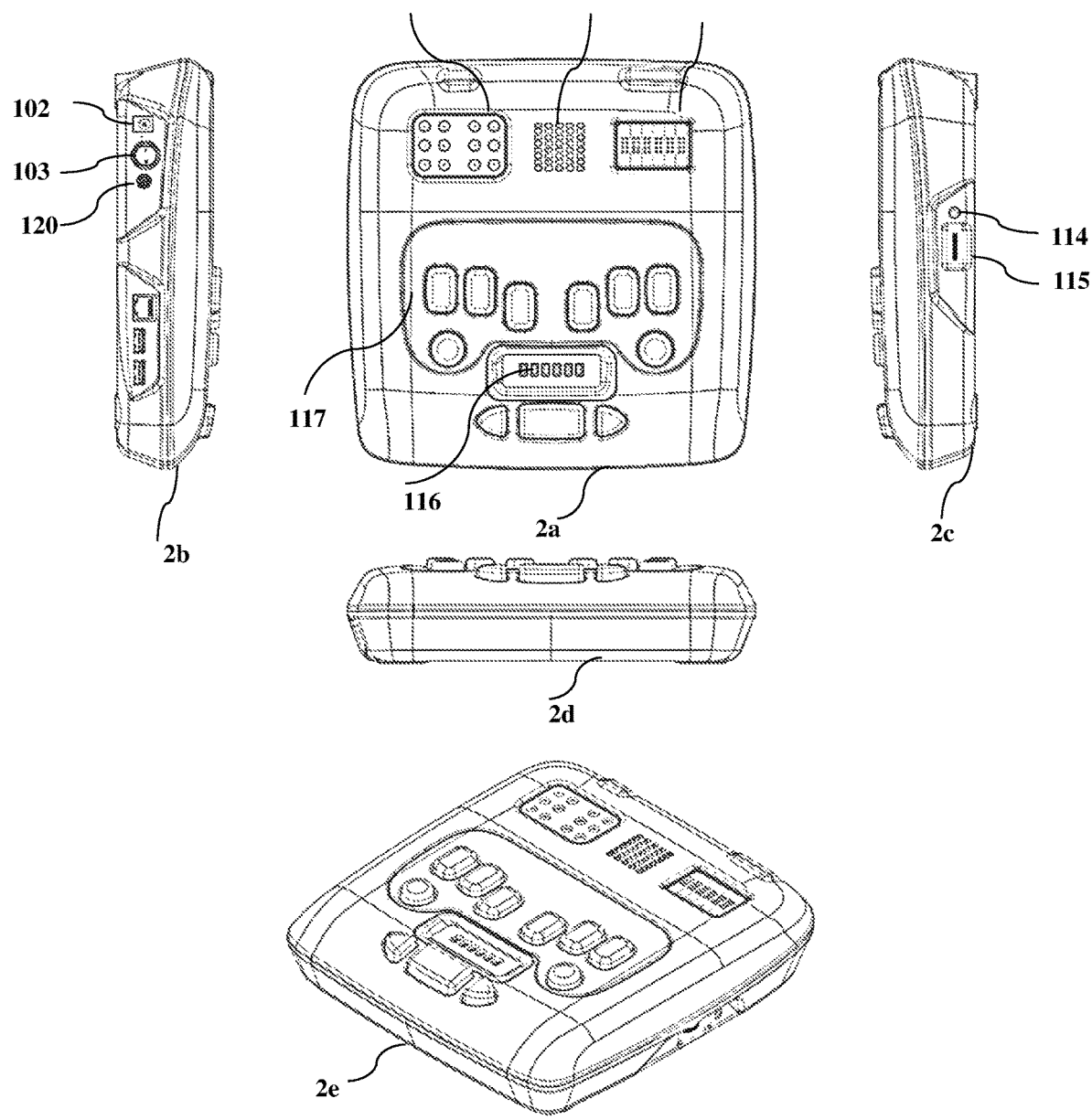
FIG. 2 shows the top, left, right, front and isometric views of one embodiment of the present invention.

FIG. 2 shows the top, left, right, front and isometric views of one embodiment of the present invention.

FIG. 2a shows the top view of the system of the present invention. This view distinctly displays the position of Large Braille display (110), speaker (113) and standard braille display (108). The digital Braille slate (116) is also seen in this view.

FIG. 2b is the left side view of the system showing the input for power supplied to the power and battery management system (102), the ON/OFF switch (103) and the proximity touch sensor (120).

FIG. 2c is the right side view of an embodiment of the present invention. Here the Audio jack (114) and the volume control knob (115) are seen.

FIG. 2d shows the front view and FIG. 2e is the isometric view of the system of the present invention. The braille keyboard (117) incorporated in the system contains a total of 11 keys, 6 of which are braille keys, a backspace key, new line key, spacebar key and a left and right arrow keys. Each of the 6 braille keys corresponds to a dot in a braille character. The left and right arrow key and the spacebar key allow user to navigate across the content and the different modes of operation of the system. The keys are arranged in an ergonomical manner. The keyboard (117) is electronically connected to the microcontroller (106) and which acts as an input mode for users to type in braille data and navigate across different modes.

The power switch (103) is used to turn the system ON or OFF. It is a simple toggle/rocker switch. A rocker switch is better ergonomically compared to a push button type switch, as a user can easily identify the state (ON/OFF) by the position of the switch. On indication LED (105) is used to indicate the state of the system visually to a sighted user/companion. Glowing LED indicates that the system is ON. Proximity touch sensor (120) is placed near the power switch (103) and is provided as another mode of input to the system. It serves the purpose of indicating the state of the system to a visually impaired user via vibration. It reads an input when the user taps/touches the pad, the same is read by the microcontroller (106) which then sends a signal to the vibration motor driver (118) to intermittently rotate the vibration motor (119) producing vibration. A single touch makes the vibration motor run for a short burst indicating that the system is ON. A double touch is used to repeat the last audio instruction. The vibration motor driver (118) causes the vibration motor (119) to rotate intermittently causing a controlled vibration based on the signal from the microcontroller (106). The vibration is used as another haptic mode of output to indicate different states like incorrect answer, acknowledgement of an input etc.

The digital braille slate (116) is incorporated as an input method for the system allowing a user to input braille by means of writing. It is a digitized version of a conventional braille slate which is used by visually impaired people to write braille on paper. The user places the paper inside the slate (116) and dots are embossed on it using a stylus. The user then has to remove the paper out from the slate and flip it to read the dots embossed.

Figure 3:
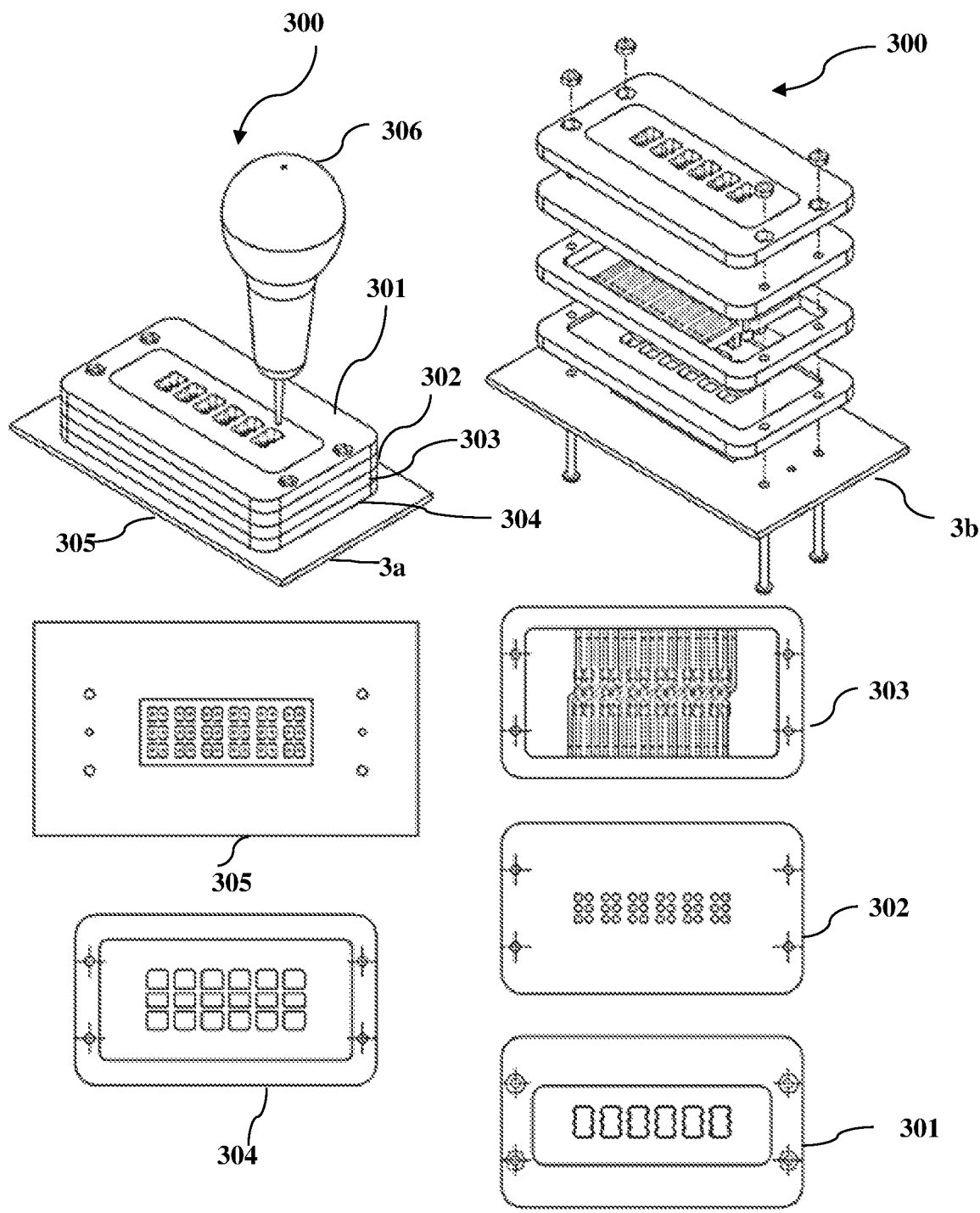
FIG. 3 shows in detail the parts of the digital braille slate.

FIG. 3 shows in detail the parts of the digital braille slate (116). The digital Braille slate (116) hosts a plurality of braille cells. Each cell contains 6 dots arranged in a 2 column 3 row matrix. The digital braille slate is built using a stack of 5 parts namely the slate cover (301), the slate (302), the embosser (303), the base spacer (304) and the Printed Circuit Board (PCB) with the switches assembled (305).

FIG. 3a shows the position of the parts comprising the digital braille slate (116). The slate cover (301) is similar in form and function to the top part of the conventional braille slate under which paper is kept. Each hole in this component represents a cell and the walls of holes act as a guide-way for a stylus to align with dots before they are embossed. The slate (302) is a part designed to mimic the surface of a paper similar to the traditional braille slate. The part has cylindrical holes corresponding to each of the 6 dot in a braille cell. The embosser (303) is a part designed to transfer the embossing force applied by the user using a stylus to the tactile switches. The part contains two opposing rows of cantilever arms with cylindrical extrusion on the top side and off-setted rectangular extrusion called push-pads on the bottom. The base spacer part (304) is used to provide a vertical spacing between the embosser and the printed circuit board (PCB) (305). The base spacer also provides a guide-way to the cantilever arms so as to prevent any lateral deflection of the arms. The PCB (305) hosts a matrix of micro tactile switches electrically soldered to it. These switches are arranged in matrix of 2 columns 3 rows per cell similar to the arrangement of dots in a braille cell. The PCB (305) is electronically connected to the microcontroller (106) such that the microcontroller (106) can read the signals generated by the actuation of the switches.

FIG. 3b shows the manner in which the parts (301) to (305) are assembled together to form the digital braille slate (116). The assembly happens such that every cylindrical extrusion on the top side of the embosser (303) aligns co-axially inside the corresponding hole on slate (302). The stylus (306) is aligned co-axially to the dot to be embossed with the help of the guides in the walls of the holes of the slate cover (301). Once aligned, when the user pushes the stylus (306) down, the tip of the stylus (306) comes in contact with the cylindrical extrusion on the embosser (303). The force applied on the stylus (306) is transmitted to the cylindrical extrusion causing the cantilever arms to deflect or bend longitudinally until the rectangular extrusion at the bottom i.e. the push pads comes in contact with the tactile switch on the PCB (305). Further application of force causes the switch to be actuated creating an electrical signal which is read by the microcontroller (106). Upon removal of the stylus (306) the cantilever arms retract back to their original position. Since the PCB (305) hosts a matrix of switches, a keyboard scan (matrix polling) method is employed to identify which switch was actuated.

The amplifier module (112) amplifies the audio signals received from the microcontroller (106) and directs them to the speaker (113). An audio jack (114) is provided to route the audio signal out of the system to an external speaker or a headphone. A volume control knobs (115) helps to attenuate the sound output level.

According to the present invention, the smart interactive system further comprises large braille display (110) having two large braille cells. They are enlarged refreshable braille cells of 3×2 matrices each. The smart interactive system (100) further comprises the standard braille display (108) and a row of standard braille cells. These standard braille cells are 6 in number, all in one row. Each standard braille cell is of 8 dots with 4*2 matrices. The digital braille slate (116), the large braille display (110) and the standard braille display (108) as mentioned earlier could include any number of braille cells by increasing the row size to fit the required number of braille cells. All the communication that happens between the functional modules is through I2C serial communication.

According to the present invention, the actuator drivers (107) and (109) make up the bulk of the electronics for both the large cell and standard cell display. These actuator drivers (107) and (109) are powered by the Power and battery management system (102) and interface with the microcontroller (106) through serial communication and are responsible for driving the electromagnetic actuators of the large and standard braille displays (108) and (110), as required. A different combination of actuators triggered forms a combination of dot pattern representing a particular braille character.

According to an embodiment of the present invention, a large braille display (110) includes 2 large braille cells. Each braille cell on the display includes 6 pins arranged in 3 rows and 2 columns matrix. Each pin can be raised and lowered individually via dedicated electro-mechanical actuators facilitating display of different characters. The matrix is scaled up compared to the conventional standard size of a braille cell, thus making it highly convenient for users to identify individual dots, patterns and combinations. The raising and lowering of individual pins is achieved by a linear actuation mechanism of the electromagnetic actuators.

The actuator feedback (111) includes a series of proximity sensors used to make the system of two large braille cells a closed loop system. The proximity sensors could be either based out of contact, capacitive, inductive or Hall Effect based. The proximity sensors detect the position of the actuators that is, whether they are linearly extended or retracted and communicate the same to the microcontroller (106). If the system of actuators behaves in a way other than the intended, actuator feedback system (111) sends relevant signals to the microcontroller (106) which sends corrective signals accordingly back to the actuator driver (109) thereby making the entire system response more accurate and reliable.

According to an embodiment of the present invention, the standard braille display (108) consists of a row of refreshable tactile braille display cells. Any kind of braille text can be displayed on the standard braille display and the user can read them with their fingertip. While the large braille display (110) helps a user to identify and learn dot patterns, repeated practice of reading over the standard braille display (108) would help them develop the tactile sensitivity on their fingertip needed to read braille. Any system of known prior art technologies of refreshable braille display can be used for this module.

The proposed system also includes a USB port/s, and a LAN port, wireless Wi-Fi and Bluetooth connectivity. All the above mentioned modules interface with a central microcontroller (106). The microcontroller (106) in turn controls all the modules, as per predefined software, together forming a complete voice and tactile data input-output learning system.

According to the proposed solution, the smart interactive system is the only system that teaches braille reading, writing and typing through interactive audio-tactile lessons. The proposed system involves a wide range of multilingual content which are structured as lessons of gradually increasing levels of difficulty.

The content helps the user to self-improve each of the aforementioned braille literacy skills through real-time corrective feedback and reinforcement of the corrections over time. The system also allows the user to practice and build their braille proficiency through multiple game-based content pieces aimed at improving reading, writing and typing rates and vocabulary. Furthermore, in a classroom setting users receive leaderboard info for each lesson making the learning experience engaging and collective. Each lesson is modeled as a directed graph of elementary lesson interactions encoded as a JSON which the software can parse and execute.

Figure 4:
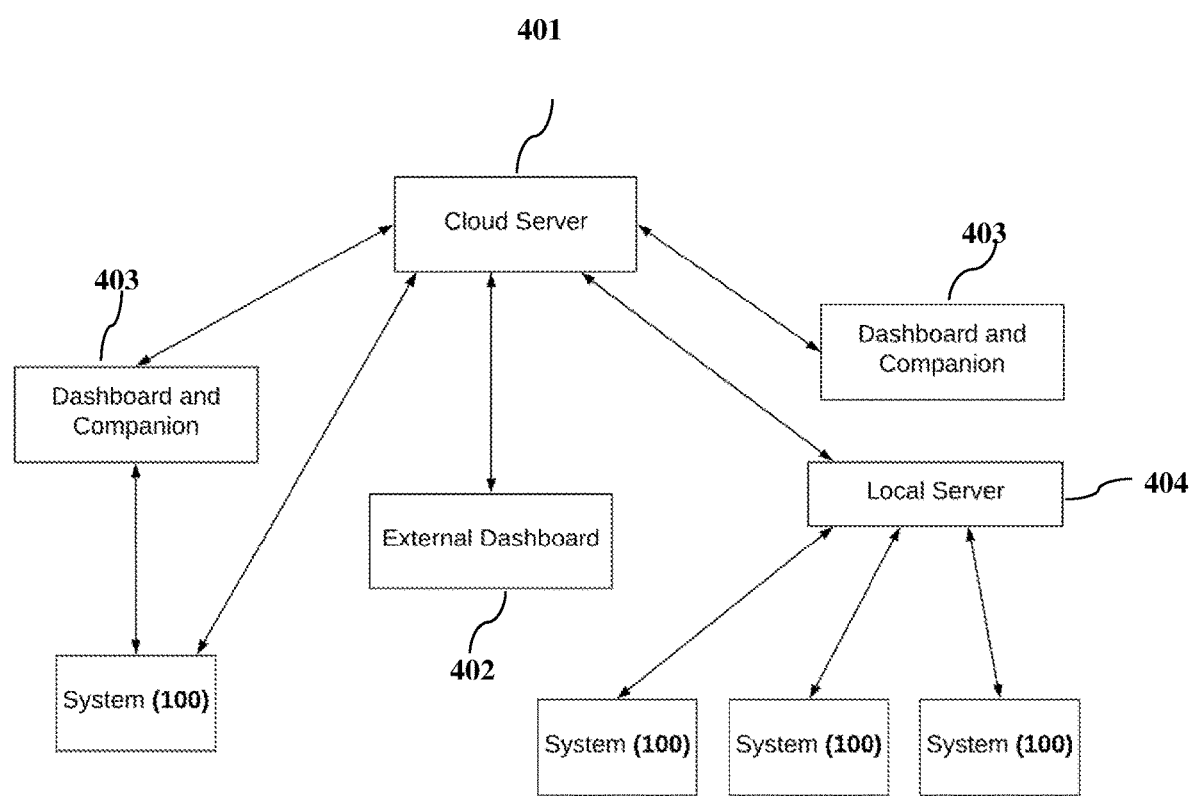
FIG. 4 shows an ecosystem architecture for remote content and software updates to the system and usage data upload from the system to the cloud server.

As shown in FIG. 4, the system (100) is directly or indirectly connected to the internet to connect to the cloud server (401). The connectivity to the cloud server allows for remote over-the-air software, content and user setting updates to the system (100), along with usage data upload to the cloud server (401). In order to achieve internet connectivity in locations with unreliable, intermittent or slow internet connectivity the system(s) (100) connect to a locally installed server (404) for updates and data sync which in turn periodically syncs data to and from the cloud server (401) when internet connectivity is available. Moreover, the cloud server provides access to smart dashboards (403, 402) to monitor user progress and usage statistics to be used by teachers, parents and administration; along with the Companion App which lets parents and teachers customize the user's lessons and user settings such as the braille grade. The dashboards and companion app (402, 403) can be accessed on any device connected to the internet such as a phone, tablet or laptop.

The present invention addresses the pain points of low braille literacy among the visually impaired by helping them learn how to read, write and type in braille. The proposed system could be used directly by the children and young people with visual impairment to self-learn braille and be remotely monitored by the teachers or parents. The system introduces collective and competitive learning, provide access to various braille based content and bring in easy tracking of progress.

All equivalent relationships to those illustrated in the drawings and described in the application are intended to be encompassed by the present invention. The examples used to illustrate the embodiments of the present invention, in no way limit the applicability of the present invention to them. It is to be noted that those with ordinary skill in the art will appreciate that various modifications and alternatives to the details could be developed in the light of the overall teachings of the disclosure, without departing from the scope of the invention.

What is claimed is:

1. A smart interactive audio and tactile data input-output system for braille learning comprising of, a standard braille display, a braille keyboard, a large braille display and a proximity touch sensor characterized in that the system provides immediate audio, tactile and haptic feedback for braille learning, the smart interactive audio and tactile data input-output system for the braille learning comprising:
    a) an external power supply to provide power to a power and battery management system which in turn powers the entire system;
    b) a microcontroller connected to the braille keyboard, a digital braille slate, the proximity touch sensor, the large braille display, and the standard braille display, wherein the microcontroller interfaces and controls the braille keyboard, the digital braille slate, the proximity touch sensor, the large braille display, and the standard braille display dynamically;
    c) the braille keyboard configured to enable a user to learn how to type in braille, and to enter any braille data wherein the braille keyboard is electronically connected to the microcontroller;
    d) the digital braille slate that enables the user to learn how to enter braille data by writing or embossing dots using a stylus that is connected to the microcontroller;
    e) the proximity touch sensor which serves as an additional input mode, wherein when the user touches or taps on the proximity touch sensor a signal is sent to the microcontroller;
    f) the large braille display comprises at least one or more large braille cells and a plurality of pins, wherein the large braille display helps users to learn how to read braille characters and to easily identify individual pins, pin patterns and combinations of the pins due to the enlarged size of the individual pins, and pin patterns, and wherein the raising and lowering of the pins is achieved by a plurality of actuators, wherein the large braille display is driven by an actuator driver based on signal received from the microcontroller;
    g) an actuator feedback system which communicates with the microcontroller;
    h) the standard braille display, which consists of a plurality of standard sized refreshable braille display cells and which is driven by the actuator driver based on signal from the microcontroller wherein the repeated reading efforts on the standard braille display helps user to develop tactile sensitivity to read standard sized braille characters;
    i) an audio amplifier which amplifies an audio signal from the microcontroller (106) and sends the amplified audio signal to a speaker or a headphone via an audio jack; and
    j) a port for internet connectivity purposes.

2. The system for braille learning of claim 1, wherein the power and battery management system regulate and switch an input supply voltage to necessary lower voltage levels required by the individual modules and in the absence of external power, powers the system through battery.

3. The system for braille learning of claim 1, wherein the braille keyboard comprises of at least 11 input keys, arranged in an ergonomic manner wherein at least 6 input keys are braille keys corresponding to a dot in the braille character and at least 5 input keys help to navigate across the content and the different modes of operation of the system.

4. The system for braille learning of claim 1, wherein the proximity touch sensor acts as an additional input means wherein the microcontroller is configured such that when the user touches the proximity touch sensor the microcontroller repeats the last audio instruction on the speaker; the microcontroller is further configured to produce a pattern of tactile response via a vibration motor and or an appropriate audio instruction based on the pattern of touch input by the user on the proximity touch sensor.

5. The system for braille learning of claim 1, wherein the large braille display consists of a plurality of enlarged braille display cells, each cell having a plurality of pins matrix of 6 pins arranged in 3×2 fashion wherein each pin is either in a raised or lowered position, driven by an electromagnetic based linear actuator.

6. The system for braille learning of claim 1, wherein an actuator feedback system detects any malfunction in the operation of the electromagnetic actuators connected to pins of the large braille display and communicates it to the microcontroller wherein the microcontroller is configured to which send corrective signals to the actuator driver.

7. The system for braille learning of claim 1, wherein the system has additional wired connectivity comprising, but not limited to, universal serial bus port/s or a LAN port or wireless connectivity such as like Wi-Fi or Bluetooth.

8. The system for braille learning of claim 1, wherein the system is directly or indirectly connected to the internet allowing for remote software and content updates as well as upload of data on usage metrics.

9. A smart interactive audio and tactile input-output system for braille learning comprising,
   a. a microcontroller;
   b. a digital braille slate that is coupled to the microcontroller;
   c. a braille keyboard that is electronically connected to the microcontroller;
   d. a standard braille display, and the braille keyboard, a large braille display and a proximity touch sensor, and a speaker characterised in that the braille keyboard and the digital braille slate enables a learner to interact or input a braille data; wherein the standard braille display, the large braille display, and the speaker are configured to provide immediate audio and tactile feedback to the learner;
   e. an external power supply to provide power to a power and battery management system which powers the entire system for braille learning;
   f. the braille keyboard configured to enable the learner to learn to type in braille and to enter the braille data;
   g. the digital braille slate that enables the learner to learn to write in braille, and enter the braille data by means of writing which is by embossing dots using a stylus, wherein the digital braille slate identifies and communicates the dot being embossed to the microcontroller;
   h. the proximity touch sensor which serves as an additional input mode, wherein when the user touches or taps on the proximity touch sensor a signal is sent to the microcontroller;
   i. the large braille display comprises at least one or more large braille cells and a plurality of pins, wherein each cell of the large braille display has a matrix of 6 pins arranged in 3×2 fashion wherein each pin is mechanically coupled to an actuator, wherein the pins are either raised or lowered in different combination forming at least one braille character;
   j. an actuator feedback system comprising an arrangement of proximity sensors to detect the position of the actuators used in the large braille display which is either raised or lowered, and communicates the position of the actuators to the microcontroller thereby making the large braille display a closed loop system;
   k. the standard braille display, which consists of a plurality of standard sized refreshable braille display cells and which is driven by an actuator driver based on signal from the microcontroller;
   l. an audio amplifier which amplifies an audio signal from the microcontroller and sends the amplified audio signal to the speaker or a headphone via an audio jack; and
   m. a vibration motor driven by a vibration motor driver to generate haptic feedback, which is connected to the microcontroller;
   n. a port for internet connectivity purpose.

* * * * *